United States Patent [19]
Wood

[11] Patent Number: 6,157,752
[45] Date of Patent: Dec. 5, 2000

[54] FIBER OPTIC LINK

[75] Inventor: Jerry Wood, Lansdale, Pa.

[73] Assignee: BAE Systems Aerospace Electronics Inc., Lansdale, Pa.

[21] Appl. No.: 09/157,552

[22] Filed: Sep. 21, 1998

[51] Int. Cl.$^7$ .................................................. H04B 11/00
[52] U.S. Cl. .................................... 385/3; 385/2; 359/189
[58] Field of Search .............................. 385/2, 3; 359/189

[56] References Cited

U.S. PATENT DOCUMENTS

| | | | |
|---|---|---|---|
| 4,718,121 | 1/1988 | Epworth | 455/619 |
| 4,893,352 | 1/1990 | Welford | 455/610 |
| 5,084,779 | 1/1992 | Stanley | 359/152 |
| 5,532,857 | 7/1996 | Gertel et al. | 359/154 |

Primary Examiner—Robert Kim
Attorney, Agent, or Firm—Seidel, Gonda, Lavorgna & Monaco, PC.

[57] ABSTRACT

The present invention provides a fiber optic link utilizing asymmetric homodyne modulation and balanced detection to achieve a very high dynamic range. The link uses a Mach Zehnder Modulator to generate a double-sideband suppressed-carrier signal from a laser light signal of a carrier frequency and a modulating signal at a modulating frequency. The laser light signal is phase shifted and injected into the double-sideband suppressed-carrier signal. Two signals are generated wherein the fundamental components are out-of-phase. The two signals are input to a balanced receiver wherein the one signal is subtracted from the other, resulting in the fundamental components adding, thereby providing an improved fundamental signal.

8 Claims, 4 Drawing Sheets

FIBER OPTIC LINK

FIELD OF THE INVENTION

The present invention is directed to the field of fiber optic links. More particularly, the present invention is directed to fiber optic links utilizing asymmetric homodyne modulation and balanced detection.

BACKGROUND OF THE INVENTION

The inherent low loss, wide instantaneous bandwidth, low bulk and light-weight make optical fiber communications an attractive choice over coaxially based systems. Fiber optic links have been demonstrated to operate from RF frequencies into the millimeter wave range. They employ an externally modulated approach based on the use of high power laser light sources as signal carriers. The availability of high power, low noise laser sources has enabled the design and implementation of analog fiber optic links in the microwave range which have approximately 108 dB/Hz$^{2/3}$ spurious-free dynamic range without linearization.

An externally modulated system consists of a laser source, an external modulator, optical fiber, and at least one optical detector. A continuous wave laser is used to drive an optical wave modulator that imposes an information-bearing signal on the optical carrier lightwave. The typical modulator used is a Mach-Zehnder interferometer, an electro-optic device fabricated on a substrate, for example, lithium niobate ($LiNbO_3$), gallium arsenide (GaAs), or indium phosphide (InP). An RF information-bearing signal is impressed on a lightwave carrier within carrier within the modulator, yielding an amplitude-modulated signal which is coupled into a single mode fiber for transmission on a communications link. The modulated signal may be converted back to RF by an optical detector, commonly a PIN diode detector. The operational dynamic range of the link depends upon the total noise power at the detector, the maximum RF signal that can be detected, and the intermodulation distortion generated by the modulator.

The amplitude modulated output of the Mach-Zehnder modulator comprises a large carrier signal component and information-bearing upper and lower sidebands. The majority of the signal power transmitted on the optical link is concentrated in the carrier component; that is, that part of the signal output which does not convey information. The information is contained in the sidebands, which comprise a relatively small part of the optical power transmitted on the link. The ratio of signal power contained in the information bearing sidebands to the power of the carrier is termed the modulation index. The typical modulation index of an externally modulated optical link is on the order of 2–5% without further attempts to enhance the dynamic range of the link. The large carrier component in the modulator output produces a high DC level in the optical detector, thereby reducing its sensitivity to the much lower magnitude information signals on the link. This limits the dynamic range of the optical link.

Increasing the RF drive level to the optical modulator can increase the signal power of the information sidebands in the amplitude modulated output. However, because an electro-optical modulator, like its RF counterparts, is a nonlinear device, it generates second and third harmonics and third-order intermodulation products when operated in the non-linear region of its transfer function. Thus, to keep the modulator operating in its linear region requires limiting the modulation index to a relatively low figure (on the order of 2–3%).

It is the concentration of signal power in the carrier, which carries no information, that limits the dynamic range in the optical link. A reduction of the carrier power coupled to the optical transmission fiber would improve the dynamic range of the optical link. Increasing the signal power of the information-bearing sidebands would further enhance dynamic range. This would improve the apparent modulation index of the signal coupled to the optical transmission medium by boosting the ratio of signal power to carrier power in the signal.

U.S. Pat. No. 5,532,857 to Gertel et al. discloses a wide dynamic range optical link that uses a double-sideband suppressed-carrier linearizer. The link couples the double-sideband suppressed-carrier signal into a linear optical amplifier to increase the effective modulation index of the modulated signal. This system tends to create significant even harmonics that have detrimental effects on the signal output from the link. The Mach Zehnder modulator is not operated at the carrier null point and therefore requires complex circuitry to produce the phase shift necessary to remove the carrier signal from the modulated signal.

SUMMARY OF THE INVENTION

The present invention provides a fiber optic link. The link comprises five primary elements: an input coupler, a modulator, an output coupler, a pair of photodetectors, and a balanced receiver. The input coupler is configured for connection to a source of laser energy, to receive laser energy from the laser energy source, divide any laser energy received from the laser energy source into two laser energy signals, impart a 90° phase shift to one of the two laser energy signals and transmit each laser energy signal along a separate laser energy path. The input coupler then outputs each of the laser energy signals.

The modulator includes a first input connected to an output of the input coupler for receiving a first one of the two laser energy signals output from the input coupler. The modulator also includes a second input coupled to a source of modulating energy. The modulator receives modulating energy from the modulating energy source and is configured to modulate the laser energy signal received from the input coupler with the modulating energy to produce a double-sideband, suppressed-carrier signal. The modulator includes an output and outputs the produced double-sideband suppressed-carrier signal therefrom.

The output coupler includes a first input connected to the modulator output for receiving the double-sideband suppressed-carrier signal and a second input connected to the second output of the input coupler for receiving a second one of the two laser energy signals output from the input coupler traveling along the second laser energy path. The output coupler is configured to combine the double-sideband suppressed-carrier signal and the second laser energy signal and generate two signals resulting from the combination of the double-sideband suppressed-carrier signal and the second laser energy signal. The output coupler further includes two outputs and is configured to output one of the two resultant signals on each of the outputs.

A photodetector is coupled to each of the output coupler outputs to receive the combined signals, sense the intensity level of the optical fields and generate an electrical signal proportional to the intensity level.

The balanced receiver includes two inputs. Each of the two inputs is connected to a different one of the photodetectors and receives an electrical signal from the photodetectors. The receiver is configured to subtract one of the two electrical signals from the other electrical signal and generate a resultant output signal. The receiver includes an output and is configured to output the resultant output signal.

The present invention also provides a method for generating a high dynamic range signal over a fiber optic link. The method comprises receiving laser energy from a laser energy source at the input of the input coupler. Within the input coupler, the laser energy is divided into two laser energy signals and one of the laser energy signals is phase shifted 90° relative to the other laser energy signal. A first one of the laser energy signals is output along the first laser energy path and a second one of the laser energy signals is output along the second laser energy path. The first laser energy signal is transmitted along the first laser energy path and received by the modulator. Simultaneously, the modulator receives a modulating energy signal from a source of modulating energy.

Within the modulator, the first laser energy signal is modulated by the modulating energy signal in a manner to produce a double-sided suppressed-carrier signal. The double-sided suppressed-carrier signal is output from the modulator and input to an output coupler. Simultaneously, the second laser energy signal is also input to the output coupler.

Within the output coupler, the double-sideband suppressed-carrier signal and the second laser energy signal are combined in a manner to produce two similar, asymmetrical double sideband signals including a carrier component. The output coupler also imparts a 90° phase shift to components of the signal. The output coupler then outputs each of the two signals on a separate output.

The two signals produced by the output coupler are input to photodetectors for generating an electrical signal proportional to the intensity of the signals. The electrical signals are then input to a balanced receiver. Within the balanced receiver, one of the two electrical signals is subtracted from the other one of the two electrical signals. By subtracting one signal from the other signal, the balanced receiver produces an output signal having a fundamental term that is strongest at a carrier term null point.

DETAILED DESCRIPTION OF THE DRAWINGS

Figure 1:
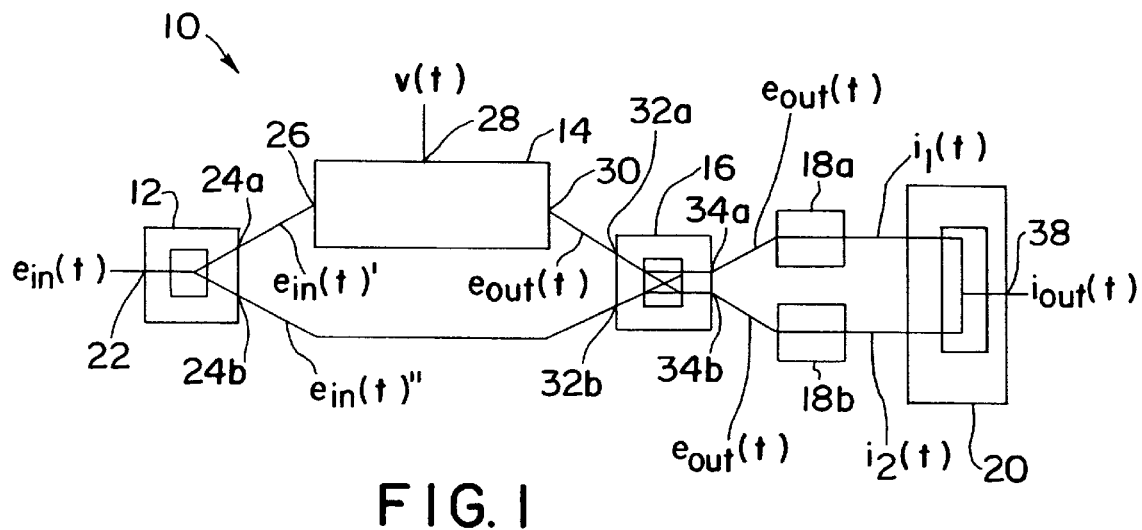
FIG. 1 is a block diagram of a fiber optic link of the present invention.

In the drawings, where like numerals identify like elements, there is shown a fiber optic link of the present invention. The link is generally designated by the numeral 10.

The link 10 includes an input coupler 12, a Mach Zehnder Modulator (MZM) 14, an output coupler 16, a pair of photodetectors 18a, 18b and a balanced receiver 20.

The input coupler 12 includes an input 22 and a pair of outputs 24a. 24b. The input coupler 22 is coupled to a source of laser light (not shown). The laser light source serves as a supply of a continuous wave (CW) laser beam. The first output 24a of the input coupler 12 is coupled to a first input 26 of the MZM 14. The MZM 14 includes a second input 28 coupled to a source of modulating energy (not shown). The MZM 14 also includes an output 30.

The MZM output 30 is coupled to a first input 32a of the output coupler 16. A second output 24b of the input coupler 12 is coupled to a second input 32b of the output coupler 16. The output coupler 16 includes a pair of outputs 34a, 34b. Each of the output coupler outputs 34a, 34b, is coupled to one of the photodetector 18a, 18b. Each of the photodetectors 18a, 18b is coupled to the balanced receiver 20. The balanced receiver 20 includes an output 38.

The fiber optic link 10 operates in the following manner. The laser light source supplies an input laser light beam $e_{in}(t)$, having a frequency $f_c$, to the input coupler 12 via the input coupler input 22. The input coupler 12 is configured to maintain the polarization of the laser light beam $e_{in}(t)$ while splitting the laser light beam into two laser light beams $e_{in}(t)'$, $e_{in}(t)''$. The frequency of the first light beam $e_{in}(t)'$ is identical to the input beam $e_{in}(t)$ however, the amplitude is different. The first light beam $e_{in}(t)'$ is then output via the input coupler first output 24a and input to the MZM 14 via the MZM first input 26. The input coupler 12 imparts a 90° phase shift to the second of the two light beams and then outputs the phase shifted light beam $e_{in}(t)''$ via the input coupler second output 24b. The frequency frequency of the second light beam $e_{in}(t)''$ is identical to the input beam $e_{in}(t)$, however, the amplitude, and phase are different. The phase shifted light beam $e_{in}(t)''$ is input to the output coupler 16 via the output coupler second input 32b. In an alternate embodiment, the input coupler 12 imparts a 90° phase shift to the first light beam and does not phase shift the second light beam. The explanation of the system will continue, however, with reference to the first embodiment.

Figure 2:
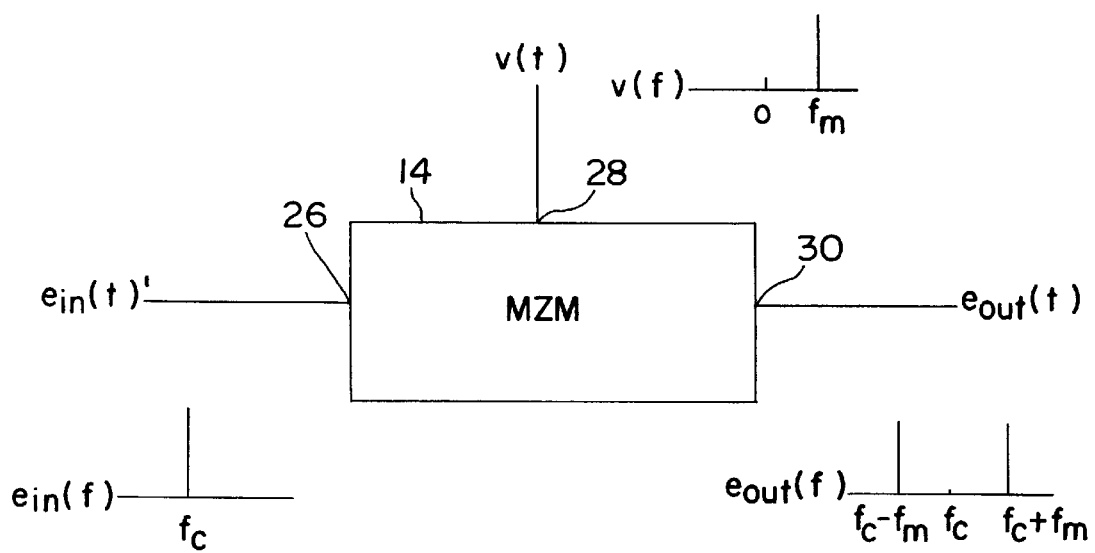
FIG. 2 is a block diagram of a conventional Mach Zehnder Modulator configured to produce a double-sideband suppressed-carrier signal.

As illustrated in FIG. 2, the MZM 14 also receives a modulating energy signal v(t) from the source of modulating energy. The modulating energy signal v(t) has a frequency $f_m$. The MZM 14 is configured to use the first light beam $e_{in}(t)'$ received at the MZM first input 26 as a carrier signal and the modulating energy signal v(t) to produce a double-sideband suppressed-carrier signal $e_{out}(t)$ at the MZM output 30.

Figure 3:
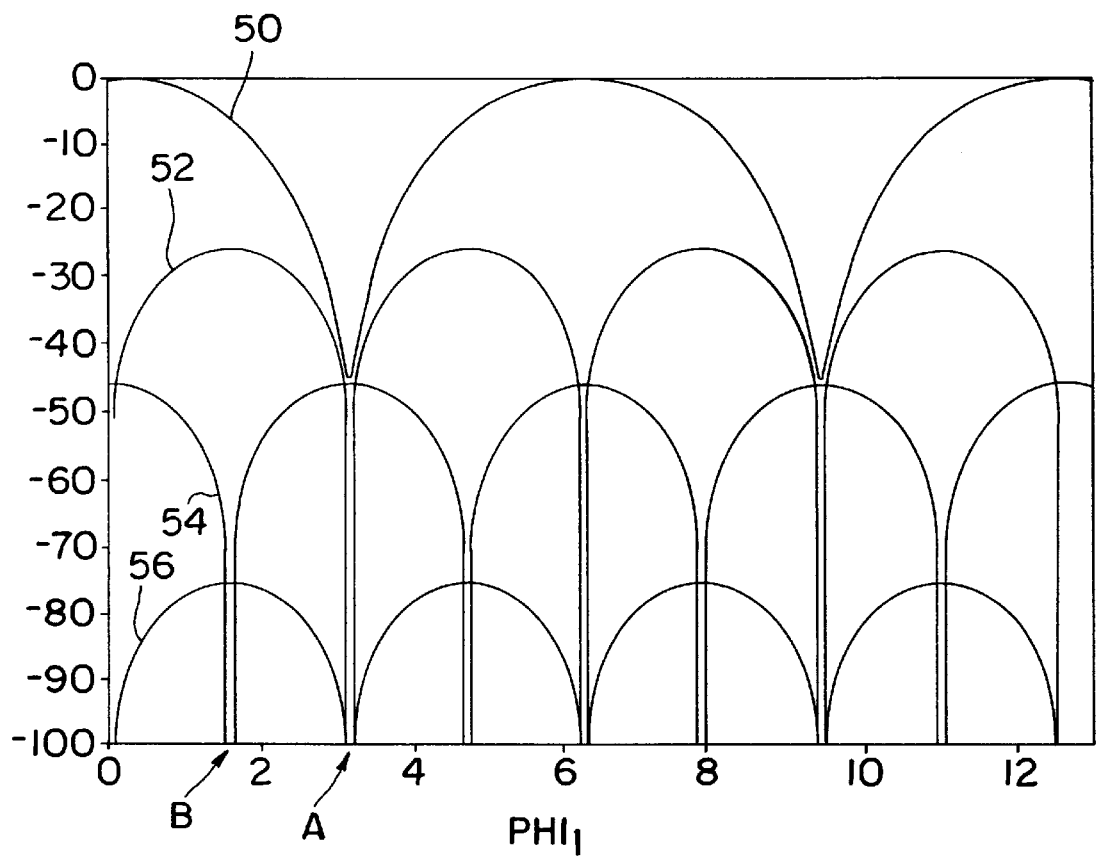
FIG. 3 is a graph illustrating the harmonic content of a signal output from the Mach Zehnder Modulator of FIG. 2.

FIG. 3 illustrates a graph of the harmonic content of a Mach Zehnder Modulator, such as the MZM 14 used in the present invention. The graph illustrates curves for the carrier (dc) component 50, the fundamental component 52, the second order harmonic component 54, and the third order harmonic component 56. A conventional quadrature Mach Zehnder Modulator operates at an operating point of 1.57 radians (Point B). In the present invention, the MZM 14 operates with a +45° phase bias on one leg and a −45° phase bias on the other leg to realize a composite 90° phase bias. Operating at such a phase bias, the fundamental component 52 and the third order harmonic component 56 are at a maximum, while the second order harmonic component 54 is at a null point. Furthermore, while the dc component 50 is down 6 dB from a maximum, a significant amount of the overall signal power output from the MZM at an operating point of 1.57 radians is from the dc component 50. This will tend to saturate a photodetector more quickly than desired and thereby reduce the efficiency and effectiveness of a link using a conventional Mach Zehnder Modulator. In the present invention the MZM operates at an operating point of 3.14 radians (a 180° phase bias point). In such an embodiment, the fundamental component 52 and the third order harmonic component 56 are at null points and the dc component 50 is at a minimum. The harmonic content of the output of the MZM 14 of the present invention corresponds to an operating point of 3.14 radians (point A) of FIG. 3.

The double-sideband suppressed-carrier signal is output from the MZM 14 and input to the output coupler 16 via the output coupler first input 32a. The output coupler 16 is configured to produce two signals $e_{oc1}(t)$, $e_{oc2}(t)$. To produce the first signal $e_{oc1}(t)$, the output coupler 16 imparts a 90° phase shift to the phase shifted light beam $e_{in}(t)"$ received at the output coupler second input 32b resulting in a 180° phase shift to the original laser light signal $e_{in}(t)$. The output coupler then adds this phase shifted signal $e_{in}(t)'''$ to the double-sideband suppressed-carrier signal $e_{out}(t)$ received at the output coupler first input 32a and outputs it at the output coupler first output 34a. To produce the second signal $e_{oc2}(t)$, the output coupler 16 imparts a 90° phase shift to the double-sideband suppressed-carrier signal $e_{out}(t)$ received at the output coupler first input 32a. adds this phase shifted signal $e_{out}(t)'$ to the phase shifted signal $e_{in}(t)"$ received at the output coupler second input 32b and then outputs it at the output coupler second output 34b. The two signals $e_{oc1}(t)$, $e_{oc2}(t)$ output from the output coupler 16 are equivalent except for the phase of some of the components. The link is now asymmetric due to the injected DC term $e_{in}(t)"$. The following defines the relationship between the various signals at succeeding points of the link 10.

$e_{in}(t)'$ $e_{in}(t)$ $e_{in}(t)"$ $e_{in}(t)$ phase shifted 90°

$e_{in}(t)'''$ $e_{in}(t)"$ phase shifted 90°

$e_{out}(t)$ modulated double-sideband suppressed-carrier signal of $e_{in}(t)'$ and v(t)

$e_{out}(t)'$ $e_{out}(t)$ phase shifted 90°

$e_{oc1}(t)$ $e_{out}(t)+e_{in}(t)'''$ $e_{oc2}(t)$ $e_{out}(t)'+e_{in}(t)'$

Figure 4A:
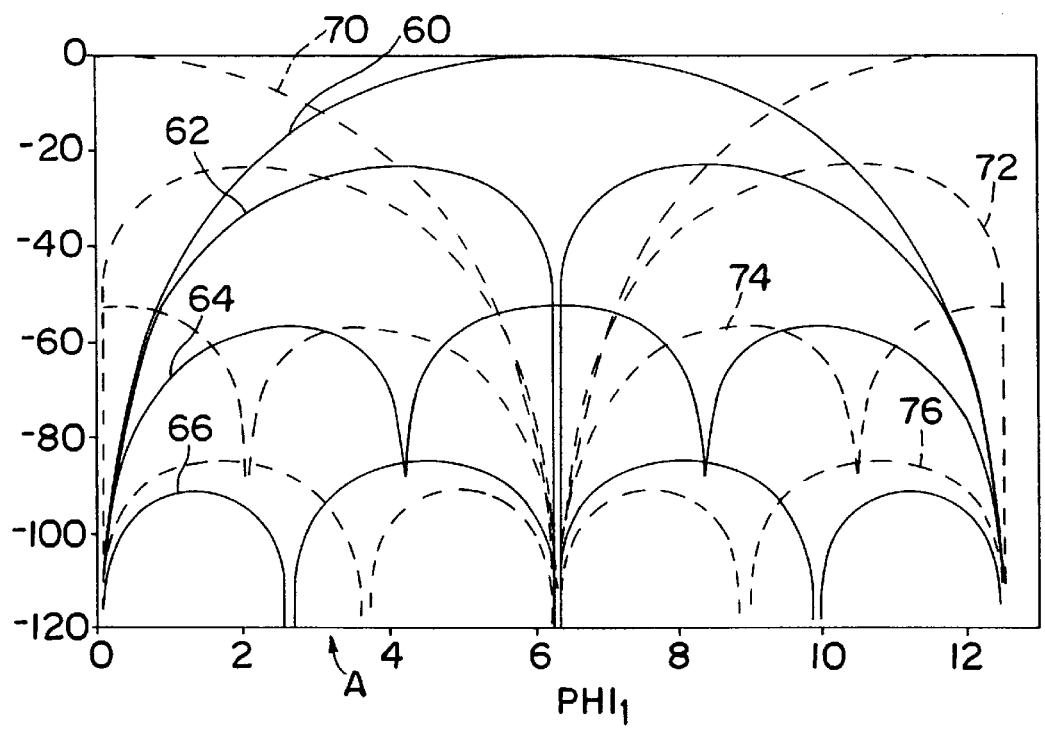
FIGS. 4(a)–4(b) are graphs illustrating the harmonic content of a signal output from an output coupler of the fiber optic link of FIG. 1.
Figure 4B:
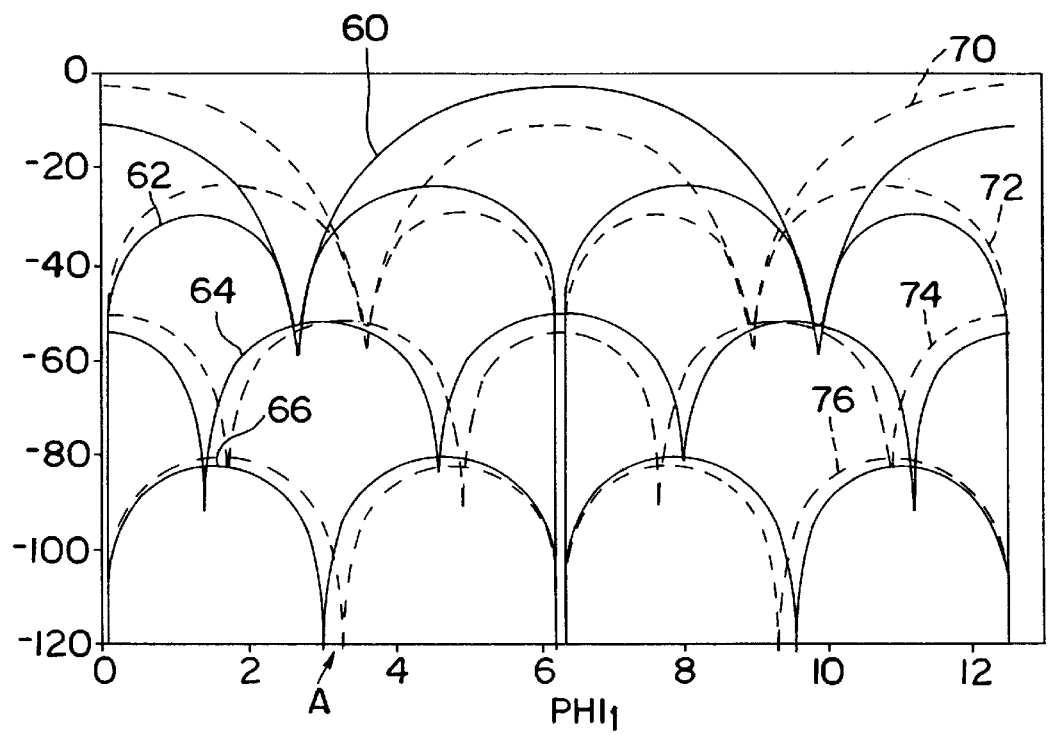

FIG. 4 presents the harmonic content for both outputs of the output coupler 16 (prior to the photodetectors). FIG. 4(a) illustrates the harmonic content for both outputs of the output coupler 16 wherein 50% of the input optical power of the input signal $e_{in}(t)$ is carried by each of the signals $e_{in}(t)'$, $e_{in}(t)"$ output from the input coupler 12. FIG. 4(b) illustrates the harmonic content for both outputs of the output coupler 16 wherein 95% of the input optical power of the input signal $e_{in}(t)$ is carried by the signal $e_{in}(t)'$ input to the MZM 14 and 5% of the input optical power is carried by the phase shifted signal $e_{in}(t)"$.

Referring now to FIG. 4(a), the harmonic profile illustrated therein is representative of $e_{oc1}(t)$ (solid lines) and $e_{oc2}(t)$ (dashed lines). The harmonic content of the signal $e_{oc1}(t)$ output from the output coupler first output 34a, as illustrated in FIG. 4(a), includes a carrier component 60, a fundamental component 62, a second order harmonic component 64. and a third order harmonic component 66. The harmonic content of the signal $e_{oc2}(t)$ output from the output coupler second output 34b, as illustrated in FIG. 4(a) also includes a carrier component 70, a fundamental component 72, a second order harmonic component 74. and a third order harmonic component 76.

As illustrated in FIG. 4(a), the carrier components 60,70 and the fundamental components 62,72, of the signals $e_{oc1}(t)$, $e_{oc2}(t)$, respectively, output from the output coupler 16 do not have null points at the operating point A, as compared to the output signal of the MZM $e_{out}(t)$ as illustrated in FIG. 3. In contrast, at the operating point A, the fundamental components 62, 72 are only approximately 5 dB below their peak. Furthermore, comparing the two signals $e_{oc1}(t)$, $e_{oc2}(t)$ at the 180° bias point (operating point A) it can be seen that the power level in both signals is equal for all terms. Specifically, the null point for the fundamental component 62 and the second order harmonic component 64 of one signal $e_{oc1}(t)$ is located at a phase bias point of 6.28 radians and the null point for the fundamental component 72 and the second order harmonic component 74 of the other signal $e_{oc2}(t)$ is located at a phase bias point of 0 radians.

FIG. 4(a) illustrates the intersection of the components of the two signals $e_{oc1}(t)$, $e_{oc2}(t)$ at the operating point A (3.14 radians) of the link 10.

Each of the two signals output from the output coupler 16 is fed to one of the two photodetectors 18a, 18b. The photodetectors 18a, 18b sense the intensity I of the optical signals and convert the sensed optical signal to an electric signal, either in the form of a current signal or a voltage signal. The electric signals, for example, a current signal $i_1(t)$ and $i_2(t)$ from each of the photodetectors 18a, 18b, respectively, is proportional to the square of the optical signals, $e_{oc1}(t)$, $e_{oc2}(t)$, respectively input to the photodetectors 18a, 18b. These electrical signals $i_1(t)$, $i_2(t)$, are input to the balanced receiver 20. The balanced receiver 20 subtracts the first current signal $i_1(t)$ from the second current signal $i_2(t)$.

Figure 5:
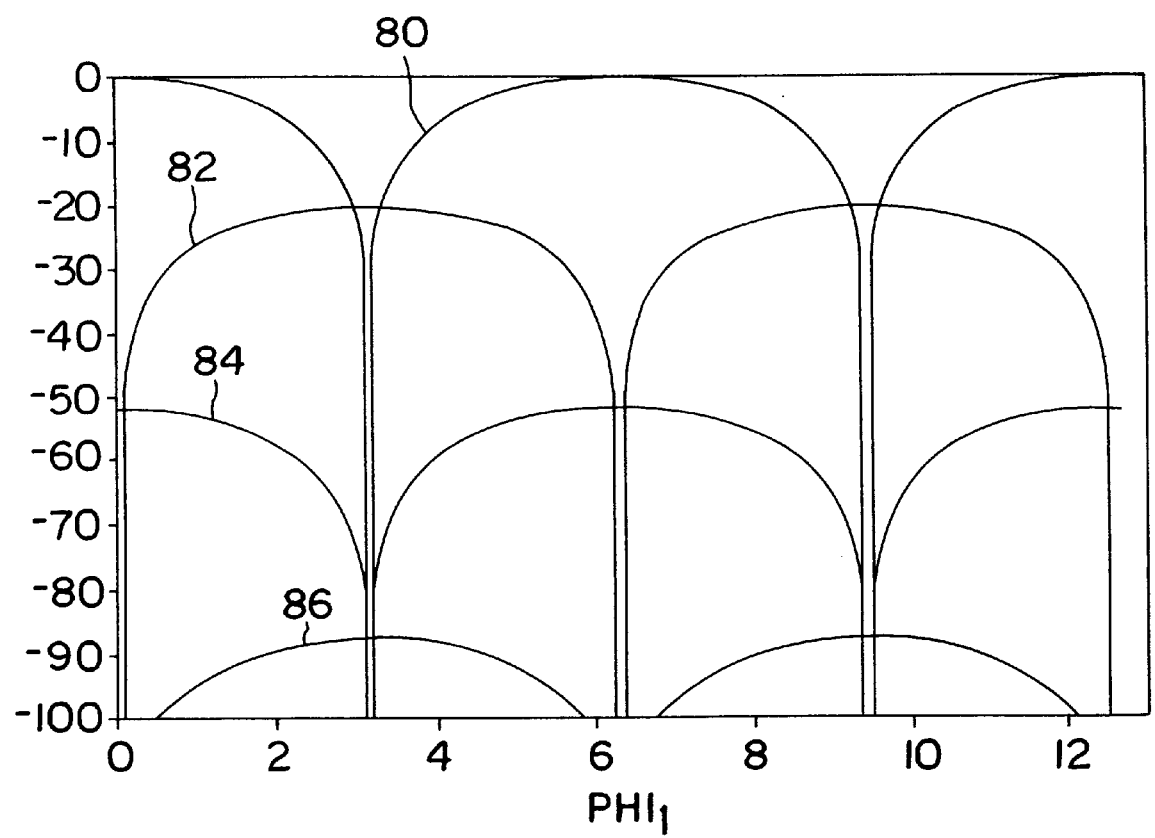
FIG. 5 is a graph illustrating the harm onic content of a signal output from a balanced receiver of the fiber optic link of FIG. 1.

Because of the phase shift imparted to the particular components of the two signals $i_1(t)$, $i_2(t)$, as discussed above, certain of the components will add in the balanced receiver 20 instead of subtract. Specifically, the carrier components subtract, the fundamental components add, the even harmonic components subtract and the odd harmonic components add. Referring again to FIG. 4(a), because the carrier components 60, 70 and the second order harmonic components 64, 74 intersect at the operating point A, when these components are subtracted the result will be complete suppression of these components, as illustrated in FIG. 5. FIG. 5 presents a graph representative of the harmonic content of the output signal $i_{out}(t)$ of the link 10. As a result of the phase shifting by the couplers 12, 16 and the injection of the dc component $e_{in}(t)"$ back into the double-sideband suppressed-carrier signal $e_{out}(t)$, at the operating point A of the link 10, the dc component 80 and the second order harmonic component 84 are suppressed and the fundamental component 82 is maximized; more importantly the fundamental component 82 is also increased at the operating point compared to the output of the MZM 14, as illustrated in FIG. 3. While the third harmonic component 86 is also increased at the operating point, it is at a lower level than the equivalent terms output from the MZM 14. This is a result of the dc term being added back into the double-sideband suppressed-carrier signal $e_{out}(t)$ by the output coupler 16 making the signals $e_{oc1}(t)$, $e_{oc2}(t)$ output from the output coupler 16 asymmetric. Since the signal power is increased by about 6 dB, the overall output signal to noise ratio at the operating point is increased by 3 dB and the link dynamic range (dB/$H_z^{2/3}$) is increased by 2 dB. Furthermore, the third order intercept (IP3) is increased by 6 dB which in turn increases the two-tone spur free dynamic range by 12 dB. The present invention allows all of the current on the photodetectors to be used. By utilizing all of the current on the photodetectors the total improvement of spur free dynamic range will go to 124 db/$Hz^{2/3}$ with a two milliwatt photodetector in contrast to 108 dB/$Hz^{2/3}$ for the same two milliwatt photodetector in a conventional link at the same operating point.

The present invention may be embodied in other specific forms without departing from the spirit or essential attributes thereof and, accordingly, reference should be made to the appended claims, rather than to the foregoing specification, as indicating the scope of the invention.

What is claimed is:

1. A fiber optic link, comprising:

an input coupler connectable to a source of laser energy, the input coupler configured to receive laser energy from the source divide received laser energy into two signals for transmission along two laser energy paths, impart a 90° phase shift to one of the two signals, and output each signal along one of the two laser energy paths;

a modulator including a first input connected to the input coupler for receiving laser energy traveling along a first one of the laser energy paths and a second input coupled to a source of modulating energy for receiving modulating energy, the modulator configured to modulate laser energy received from the input coupler with modulating energy to produce and output double-sideband suppressed-carrier signals;

an output coupler having a first input connected to the modulator for receiving double-sideband suppressed-carrier signals produced by the modulator and a second input connected to the input coupler for receiving laser energy traveling along a second one of the laser energy paths, the output coupler configured (1) to impart a 90° phase shift to laser energy traveling along the second laser energy path and combine this phase shifted laser energy with signals received from the modulator, (2) to impart a 90° phase shift to signals received from the modulator and combine these phase shifted signals with laser energy traveling along the second laser energy path, and (3) to output the two combination signals; and a balanced receiver connected to the output coupler and having a first input for receiving one of the two combination signals produced by the output coupler and a second input for receiving the other of the two combination signals produced by the output coupler, the receiver configured to subtract signals received by the first input from signals received by the second input and output a resultant difference signal.

2. A fiber optic link, comprising:

an input coupler connectable to a source of laser energy, the input coupler configured to receive laser energy from the source, divide received laser energy into two signals for transmission along two laser energy paths, and output each signal along one of the two laser energy paths;

a modulator including a first input connected to the input coupler for receiving laser energy traveling along a first one of the laser energy paths and a second input coupled to a source of modulating energy for receiving modulating energy, the modulator configured to modulate laser energy received from the input coupler with modulating energy to produce and output double-sideband suppressed-carrier signals;

an output coupler having a first input connected to the modulator for receiving double-sideband suppressed-carrier signals produced by the modulator and a second input connected to the input coupler for receiving laser energy traveling along a second one of the laser energy paths, the output coupler configured to combine laser energy traveling along the second laser energy path and double-sideband suppressed-carrier signals received from the modulator and to output two combination signals; and a balanced receiver connected to the output coupler and having a first input for receiving one of the two combination signals produced by the output coupler and a second input for receiving the other of the two combination signals produced by the output coupler, the receiver configured to subtract signals received by the first input from signals received by the second input and output a resultant difference signal.

3. A fiber optic link according to claim 2, wherein the source generates laser energy at a carrier frequency.

4. A fiber optic link according to claim 2, wherein the input coupler imparts a 90° phase shift to laser energy traveling along one of the two laser energy paths.

5. A fiber optic link according to claim 2, wherein the output coupler adds a carrier frequency into double-sideband suppressed-carrier signals produced by the modulator.

6. A fiber optic link according to claim 2, wherein each signal output by the output coupler includes a carrier term, a fundamental term, and a plurality of even and odd harmonic terms such that (1) the carrier term and the even harmonic terms of one signal are in-phase with the carrier term and the even harmonic terms of the other signal and (2) the fundamental term and odd harmonic terms of one signal are out-of-phase with the fundamental term and odd harmonic terms of the other signal.

7. A fiber optic link according to claim 2, wherein the output coupler imparts a 90° phase shift to the laser energy traveling along the second laser energy path prior to adding the second laser energy path signal to the first laser energy path signal and imparts a 90° phase shift to the double-sideband suppressed-carrier signal prior to adding the first laser energy path signal to the second laser energy path signal.

8. A method of generating a high dynamic range signal over a fiber optic link, comprising the steps of:

receiving laser energy at an input coupler;

within the input coupler, dividing the received laser energy into two equivalent signals, imparting a 90° phase shift to one of the two signals and outputting the non-shifted signal along one of a first path and a second path and outputting the shifted signal along the other path;

receiving the first path signal and modulating energy at a modulator;

within the modulator, modulating the first path signal with the modulating energy thereby producing a double-sideband suppressed-carrier signal and outputting the double-sideband suppressed-carrier signal;

receiving the second path signal and the double-sideband suppressed-carrier signal at an output coupler;

within the output coupler, imparting a 90° phase shift to the second path signal and combining the phase shifted second path signal with the double-sideband suppressed-carrier signal, imparting a 90° phase shift to the double-sideband suppressed-carrier signal and combining the phase shifted double-sideband suppressed-carrier signal with the second path signal, and outputting the two combination signals;

receiving the two combination signals at a balanced receiver;

within the balanced receiver, subtracting one of the two combination signals from the other of the two combination signals and outputting a resultant difference signal.

* * * * *